United States Patent Office 2,944,766
Patented July 12, 1960

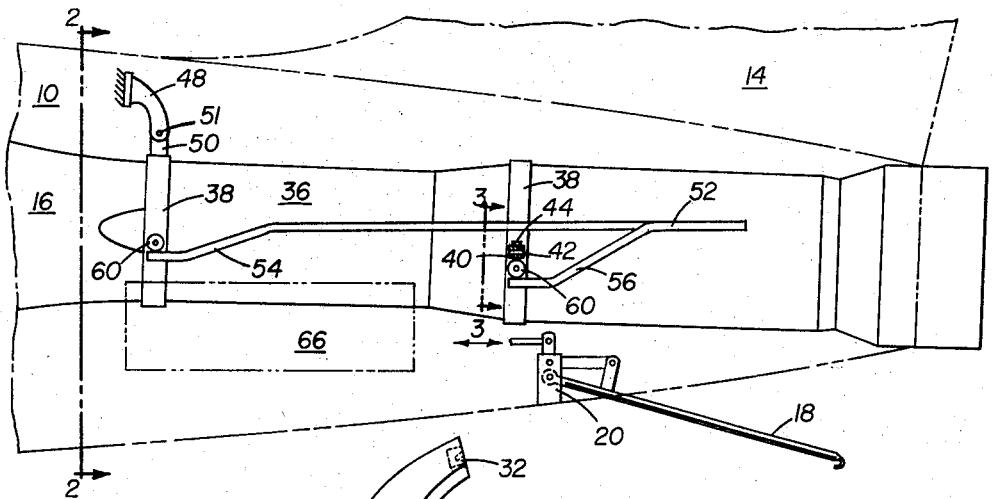
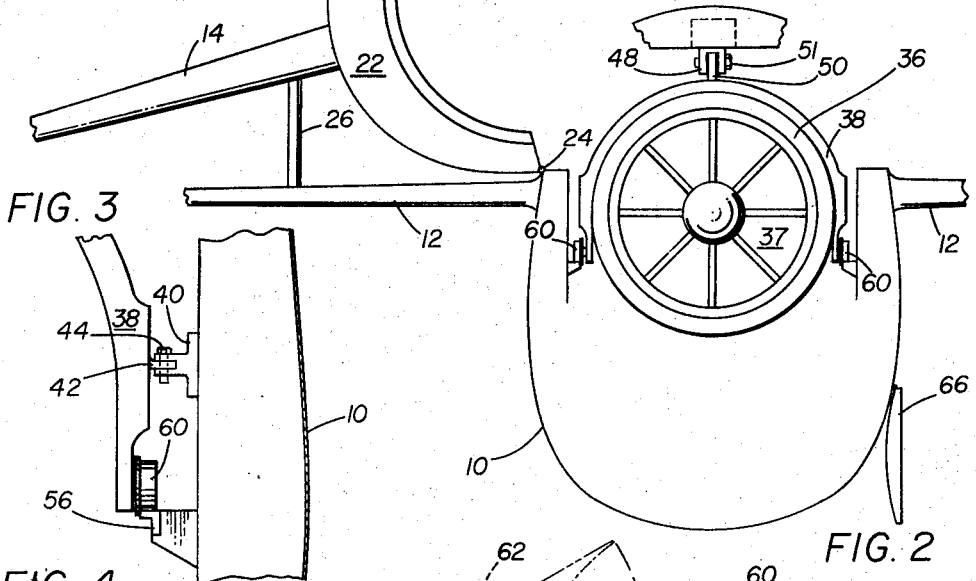
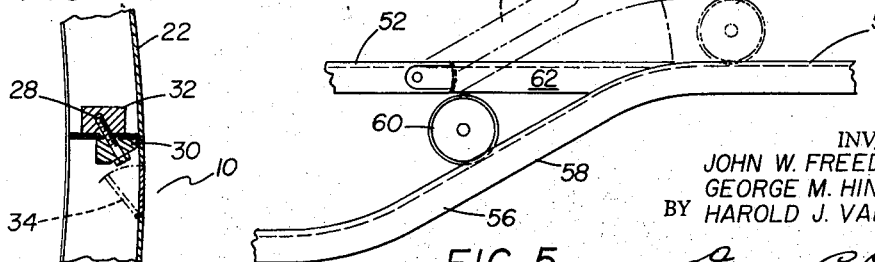

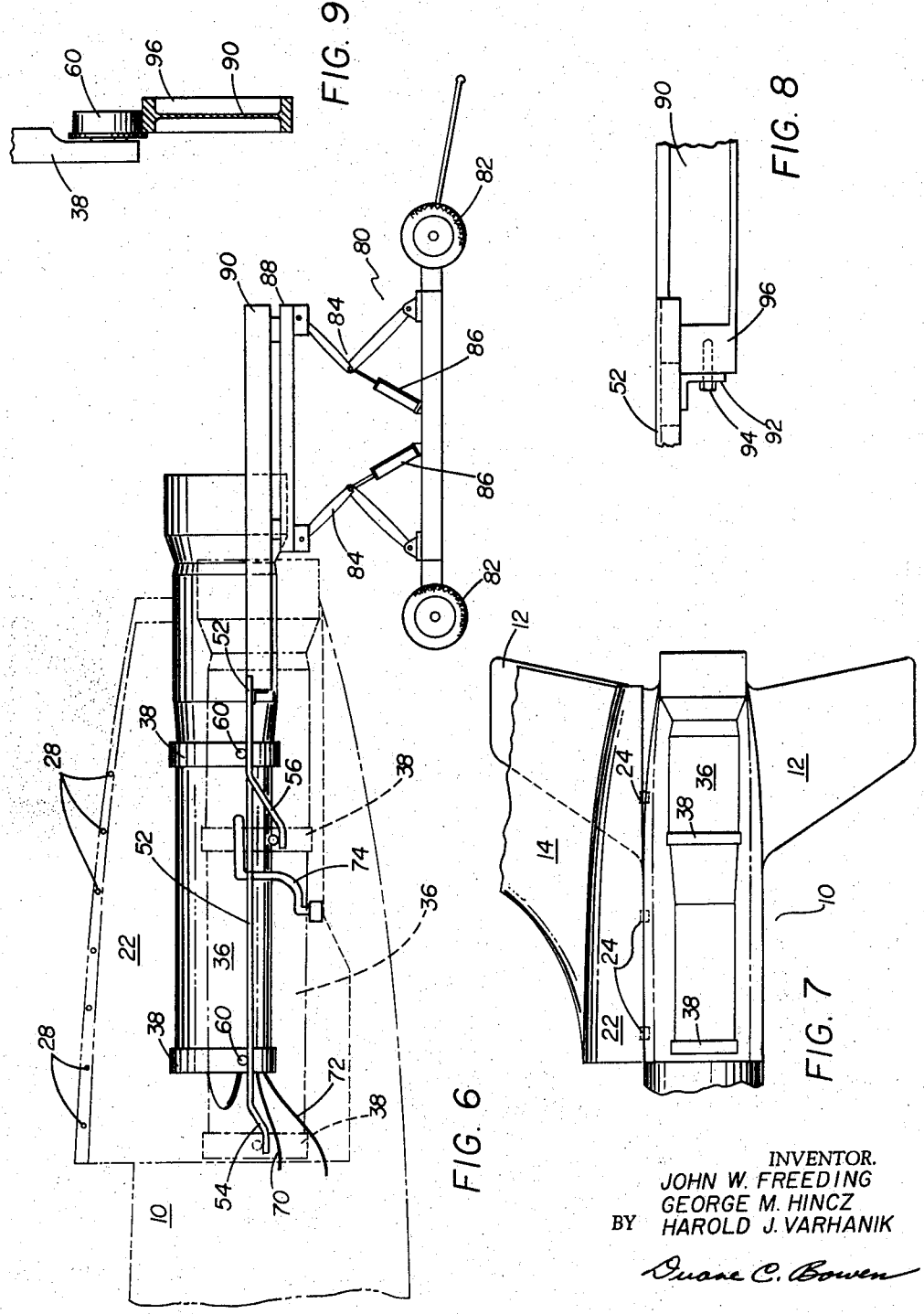

2,944,766

AIRCRAFT ENGINE INSTALLATION

John W. Freeding, George M. Hincz, and Harold J. Varhanik, Wichita, Kans., assignors to Boeing Airplane Company, Wichita, Kans., a corporation of Delaware Filed Mar. 31, 1958, Ser. No. 725,160

9 Claims. (Cl. 244—54)

Our invention relates to a jet engine installation in which the engine is mounted in the tail portion of an aircraft fuselage. We provide access for maintenance and removal of the engine by folding the upper tail portion of the fuselage to one side and by providing fuselage tracks and engine rollers bearing thereon for raising and rearward movement of the engine. Maintenance and repair operations may be accomplished in an upper position of the engine on the tracks. Removal of the engine may be accomplished by continued rearward movement of the engine from the fuselage tracks to matching tracks on a dolly.

Fuselage tail mounting of jet engines is troublesome because of lack of access for maintenance, repair and removal of the engines. The present methods of installation have various disadvantages. Installations requiring separation of major airframe structure for engine removal result in weight penalties, undue time for engine removal, requiring a large maintenance and repair working area, and difficult servicing while the engine is in place. Other methods of engine installation variously require expensive, cumbersome handling equipment, require large working spaces, and provide inadequate access for servicing, inspection and repair when the engine is not removed. Some of these problems such as the space required for engine removal and the requirement of heavy handling equipment are aggravated in carrier based aircraft.

The objects of our invention include: to devise an aircraft engine installation adapted for tail mounting of jet engines that avoids or alleviates the problems set forth above; to provide a tail installation not requiring expensive, cumbersome handling equipment; to devise a tail installation requiring less time of personnel for maintenance and replacement operations; and to provide a relatively simple mounting arrangement so that expense and weight may be minimized.

Our invention will be best understood, together with additional advantages and objectives thereof, from the following description, read with reference to the drawings, in which:

Figure 1 is a side view of a specific embodiment of our invention, the aircraft fuselage being shown in phantom and the engine installation details being shown in full lines;

Figure 2 is an enlarged view taken on line 2—2 of Figure 1 only showing the fuselage in full lines and showing the upper tail portion in folded position, much of the detail of fuselage construction being omitted;

Figure 3 is an enlarged fragmentary view of engine support and attachment means taken on line 3—3 of Figure 1;

Figure 4 is an enlarged, fragmentary sectional view showing means for securing the folding upper tail portion;

Figure 5 is an enlarged fragmentary elevation of portions of the track and roller assembly;

Figure 6 is a view similar to Figure 1 only showing the tail upper section in folded position, showing the engine in an upper position in full lines and in its normal lower position in dotted lines, and showing a dolly to receive the engine when removed;

Figure 7 is a plan view of portions of the aircraft tail assembly with the upper tail portion folded over;

Figure 8 is an enlarged, fragmentary elevational view showing means for attaching the fuselage tracks to the dolly tracks; and Figure 9 is a fragmentary, enlarged sectional view of a track on the dolly and the engagement therewith of an engine supporting roller.

Figure 1 shows a typical tail fuselage envelope in which a jet engine is to be installed and includes the fuselage 10, horizontal stabilizers 12, a vertical stabilizer 14 and an engine inlet duct 16.

An arresting hook 18 and supporting structure 20 are shown installed on the under side of the fuselage. Because of the arresting hook mechanism on carrier based aircraft which must withstand large loads and due to other lower structural members on some land based aircraft, it is inadvisable in many designs to provide engine access through the under side of the fuselage. Other methods of engine removal are to divide the fuselage immediately forward of the engine or to provide means to move the engine directly rearwardly. These methods have various advantages and disadvantages, one disadvantage being that access to the engine is limited unless the engine is completely removed.

Our approach to engine access and removal is to longitudinally divide the fuselage in the tail portion providing an upper fuselage portion 22 including vertical stabilizer 14. Hinges 24 are provided whereby upper tail portion 22 may be folded to the side for engine access in the manner shown in Figures 2, 6, and 7.

In Figure 2 a temporary support is shown at 26 between vertical stabilizer 14 and horizontal stabilizer 12 for support of upper section 22 when folded. Means to secure upper fuselage portion 22 in closed position is shown in Figure 4 in which a bolt 28 joins a structural attachment 30 in the fuselage to a tapped structural attachment 32 in the upper portion 22. A number of these spaced along the structure to be secured will provide sufficient structural attachment of upper fuselage portion 22. The loads to be carried by the upper fuselage portion are principally the air forces on the vertical stabilizer. The strength requirements are low compared with those of other structure that would be divided in order to provide engine access in another way. Access to bolts 28 is through small hinged doors 34 in fuselage 10.

Jet engine 36, which may be of turbojet or other type, has the normal operating position shown in Figures 1 and 2, and in dotted lines in Figure 6. The engine inlet duct 37 is in position to receive ram air from the inlet passageway 16. The engine is secured in this position by a pair of saddle mounts 38 attached to engine 36 by bolt means, not shown. As shown in Figures 1 and 3, the rear saddle mount 38 is secured to the structural framework of fuselage 10 by a clevis attachment 40 secured to the fuselage frame and a lug 42 on the saddle mount. Clevis 40 and lug 42 have aligned openings to receive a securing bolt 44. The forward end of the engine is secured by a clevis attachment arm 48 secured to the fuselage structure and a lug 50 on the forward saddle mount 38. Clevis arm 48 and lug 50 have aligned openings to receive a securing bolt 51.

A track assembly is provided at each side of the engine and is supported by fuselage structure. The track at each side includes common upper portion 52 and a pair of lower sections 54, 56. Upper section 52 extends generally horizontally and longitudinally of the fuselage. Lower portions 54, 56 include portions 58 extending upwardly and rearwardly for lifting engine 36 into the space previously occupied by upper fuselage portion 22. Engine 36 has a pair of rollers 60 bearing on the track. Track portion 56 is shown in the embodiment of the drawing as extending lower than track portion 54 as the engine normally slopes slightly downwardly relative the horizontal when the aircraft is supported on its landing gear. The difference in track slope and length will bring engine 36 to a more nearly horizontal position as it is raised. A pivoted track segment 62 is provided as shown in Figure 5 so that the rear roller 60 can pass onto the common track section 52.

In Figure 6 the engine 36 is supported on the fuselage 10 in raised position. A few maintenance operations can be accomplished in the Figure 1 installed position by access through doors such as 66. However, the work that can be accomplished is quite limited. In the raised position many operations can be conducted including service and adjustment, engine run-in, part replacement, and limited overhaul. Sufficient space is provided for a workman to lie under the engine for any necessary work. In general, the engine is open to the most access possible short of complete removal.

There are many lines connected to an engine in operating condition such as control and supply systems. We provide that some of these control and supply lines are still connected in the Figure 6 upper position so that engine run-in and the like may be accomplished and various system tests can be conducted in the same conditions as would occur in fully installed position. This is illustrated in Figure 6 by three lines 70, 72, 74 having flexible or other lost motion sections so that connection with engine 36 is maintained although the engine is moved upwardly and rearwardly. The systems connected to an engine include the fuel supply governor, hydraulic servo lines, pressure transducers, thermostats, fuel and lubricant supply lines, and electrical conductors.

Maximum servicing of an engine while it is supported by the air-frame is particularly important in aircraft carrier operations where maintenance space is limited. The least possible space occupied relative the amount of access has been provided by our structure. Another important factor, particularly in military application, is the time required for each maintenance operation. We provide essentially simple access and a maximum of accessibility so that the down time of an aircraft is minimized. Reduction of time also means reduction in expense. The additional weight required in the airframe to permit engine maintenance and removal has been minimized.

The engine 36 may be moved between the Figure 1 and Figure 6 positions by simple means for applying force, not shown, such as a hydraulic or mechanical jack acting between the engine and fuselage structure to provide a substantial moving force.

Another advantage in expense, space and logistics is the structure and operation shown in Figure 6 for complete removal of the engine. Some other systems for engine removal require special, expensive and cumbersome lifting equipment. All that is required in the present system is a dolly 80 of substantially the same type in general use for supporting and transporting engines. A dolly of this type usually would be needed to receive the engine even if lifting equipment were used in engine removal.

Dolly 80 includes wheels 82 and articulated legs 84 operated by hydraulic motors 86 to control the elevation of the dolly platform 88. Tracks 90 are provided on platform 88 to receive the rollers 60 secured to engine mounts 38. For safety and convenience in the removal operation, dolly track 90 can be secured to fuselage track 50 by an angle bracket 92 and a bolt 94 threadedly engaged in an end piece 96 on dolly track 90.

The folding of upper fuselage section 22 and the movement of engine 36 from the Figure 1 to the Figure 6 position by a jack have been previously described. Removal of the engine is accomplished after dolly tracks 90 are secured to fuselage tracks 52 by rolling engine 36 off track 52 onto track 90. The same simple hydraulic or mechanical jack can be used for the moving force. Another advantage of this means of engine removal is that the space required for the operation is a minimum, e.g., the only space required is the area occupied by the aircraft and the receiving dolly.

The aircraft can be towed with the engine in the Figure 6 position without moving the engine to operating position and without securing upper tail section 22. The structure required for engine access and removal is integral with the rest of the aircraft so that loose removed parts are not a problem, i.e., upper fuselage portion section 22 is still hingedly connected and supported on the aircraft in the Figure 6 position. While the structure will find most use with tail mounted engines, application will be found in some other configurations such as engines mounted within a wing. One salient feature of the design is the longitudinal division of the aircraft structure, the removal of the upper divided portion and the moving of the engine into the space previously occupied by the upper divided portion. Of the various means for moving the engine such as linkage, pivotal arms and the like, track means is considered the most advantageous for various reasons such as the feature of connecting directly to dolly tracks, as shown in Figure 6.

While a turbojet engine is illustrated, the engine installation is adaptable to various other aero-thermodynamic power plants such as ram-jet, pulse-jet, and rocket types. However, it would not be suitable for most present types of engine installations using propellers, such as turbo-prop and reciprocating engine assemblies. The invention is shown in use on a fighter type aircraft but the support system is applicable to larger aircraft, missiles or aircraft having wing-mounted engines, the use being dependent on the problem of engine access and removal in the particular aircraft configuration.

Having thus specifically described our invention, we do not wish to be understood as limiting ourselves to the precise details of construction shown, but instead wish to cover those modifications thereof which will occur to those skilled in the art from our disclosure and which fall within the scope of our invention, as described in the following claims.

We claim:

1. The improvement in an engine installation in an aircraft wherein an engine is mounted in the tail portion of the fuselage, comprising: said aircraft having a vertical stabilizer and said fuselage in said tail portion being longitudinally divided to the rear end of the fuselage providing an upper fuselage portion including said vertical stabilizer hingedly movable to one side from normal position to a position exposing said engine, a pair of tracks supported by the fuselage and disposed at the sides of the engine and rollers on said engine operable to bear on said tracks for support of said engine in removal from the fuselage, the major portion of said tracks extending generally horizontally and longitudinally of said fuselage and a minor portion of said tracks that said rollers strike in initial rearward motion sloping upwardly and rearwardly whereby said engine is lifted to an upper position into the open space provided by the movement of said upper fuselage portion to one side, said aircraft having a series of supply and control lines to said engine having connections with said engine permitting said lines to remain connected in said upper engine position whereby part of the engine systems can be operated during maintenance and repair operations in said upper engine position, said engine being removable by further rearward movement from said upper engine position.

2. The improvement in an engine installation in an aircraft wherein an engine is mounted in the tail of the aircraft fuselage, comprising: said fuselage being longitudinally divided in said tail to the rear end thereof providing an upper fuselage portion movable from normal position to a removed position exposing said engine, a track supported by the fuselage and disposed at each side of said engine and a pair of rollers on each side of said engine operable to bear on said tracks for support of said engine in removal from the fuselage, the track on each side of said fuselage being divided into two lower sections each including portions extending upwardly and rearwardly to a common upper section extending generally horizontally and longitudinally of said fuselage, said pair of rollers on each side of said engine registering with the two lower track sections on the same side of said engine in operating position of said engine and the engine being movable upwardly and rearwardly on said lower track sections, whereby maintenance operations may be conducted when said engine rests on said common upper track sections and said engine may be removed by further rearward movement.

3. The improvement in an engine installation in an aircraft wherein an engine is mounted in the tail portion of the airframe, comprising: said airframe being divided longitudinally thereof in said tail portion providing an upper airframe portion above said engine movable from normal position to a removed position exposing said engine, a track supported by said airframe and disposed at each side of said engine and roller means on each side of said engine operable to bear on said tracks for support of said engine in removal from said airframe, said tracks including portions extending partly upwardly whereby during engine removal when said upper airframe portion is in removed position said engine is raised from normal operating position to an upper position in the area formerly occupied by said upper airframe portion.

4. The subject matter of claim 3 in which said airframe is open at one end of said tracks when said upper airframe portion is in removed position and a dolly is provided having tracks alignable with and attachable to the tracks in said airframe whereby said engine is removable by movement on said roller means from the airframe tracks to the dolly tracks.

5. The subject matter of claim 3 in which said tracks include upper portions extending generally horizontally operative to support said engine by said roller means in generally horizontal orientation in said upper position, whereby maintenance operations may be conducted while said engine is in said upper position thereof.

6. The subject matter of claim 3 in which a series of supply and control lines of said aircraft are connected to said engine by means maintaining connection therewith in said upper position of said engine, whereby some testing of operation of said engine can be accomplished in said upper position.

7. The subject matter of claim 3 in which said aircraft has a vertical stabilizer and said upper airframe includes said vertical stabilizer, said upper airframe portion being hingedly connected to other airframe structure whereby the movement of the upper airframe portion from normal position to removed position is a pivoting movement.

8. The subject matter of claim 3 in which said engine has a pair of saddle mounts and said engine is attached to said airframe in said normal operating position by means secured to said saddle mounts, said rollers means being secured to said saddle mounts.

9. The improvement in an engine installation in an aircraft wherein an engine is mounted in an airframe, comprising: said airframe being divided longitudinally thereof in the area of said engine providing an upper airframe portion above said engine and a lower airframe portion below said engine and one of said airframe portions being movable from normal position to a removed position exposing said engine, and support means acting between said airframe and said engine supporting said engine for removal from a first operating position installed within the airframe to a second position at a different level located in the space previously occupied by the airframe portion that has been moved to said removed position.

References Cited in the file of this patent

UNITED STATES PATENTS

| 1,727,721 | Langlands et al. | Sept. 10, 1929 |
| 2,783,003 | Ralston et al. | Feb. 26, 1957 |

FOREIGN PATENTS

| 711,719 | Great Britain | July 7, 1954 |